United States Patent
Jiang

(10) Patent No.: US 8,601,140 B2
(45) Date of Patent: Dec. 3, 2013

(54) METHOD FOR ACQUIRING TRAVERSAL RESOURCE, PEER TO PEER NODE AND PEER TO PEER SYSTEM

(75) Inventor: Xingfeng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 674 days.

(21) Appl. No.: 12/645,299

(22) Filed: Dec. 22, 2009

(65) Prior Publication Data

US 2010/0100630 A1    Apr. 22, 2010

Related U.S. Application Data

(63) Continuation of application No. PCT/CN2008/071016, filed on May 20, 2008.

(30) Foreign Application Priority Data

Jun. 27, 2007    (CN) .......................... 2007 1 0122704

(51) Int. Cl.
*G06F 15/16* (2006.01)

(52) U.S. Cl.
USPC .......................... 709/228; 709/206; 709/249

(58) Field of Classification Search
USPC .......... 709/204–206, 226–228, 232; 370/389
See application file for complete search history.

(56) References Cited

U.S. PATENT DOCUMENTS

| | | | | |
|---|---|---|---|---|
| 7,688,820 | B2 * | 3/2010 | Forte et al. | 370/389 |
| 7,933,273 | B2 * | 4/2011 | Takeda et al. | 370/400 |
| 2004/0044727 | A1 * | 3/2004 | Abdelaziz et al. | 709/203 |
| 2006/0012614 | A1 | 1/2006 | Asao et al. | |
| 2006/0209819 | A1 | 9/2006 | Jennings et al. | |
| 2006/0268861 | A1 | 11/2006 | Sonoda et al. | |
| 2007/0127481 | A1 * | 6/2007 | Park et al. | 370/392 |
| 2008/0287058 | A1 * | 11/2008 | Nahm et al. | 455/3.02 |
| 2012/0191860 | A1 * | 7/2012 | Traversat et al. | 709/226 |

FOREIGN PATENT DOCUMENTS

| | | |
|---|---|---|
| CN | 1441569 A | 9/2003 |
| CN | 1725735 A | 1/2006 |
| CN | 1838636 A | 9/2006 |
| CN | 1863157 A | 11/2006 |
| CN | 1976356 A | 6/2007 |
| CN | 101335681 A | 8/2011 |

OTHER PUBLICATIONS

Written Opinion of the International Searching Authority issued in corresponding PCT Patent Application No. PCT/CN2008/071016, mailed Sep. 4, 2008.

Extended European Search Report issued in corresponding European Patent Application No. 08748622.1, mailed Nov. 15, 2010.

(Continued)

*Primary Examiner* — Joshua Joo
(74) *Attorney, Agent, or Firm* — Brinks Gilson & Lione

(57) ABSTRACT

A method for acquiring a traversal resource includes the following steps. A peer to peer (P2P) entity generates a message carrying a request for collecting a network address translation (NAT) traversal resource, and sends the message carrying the request for collecting the NAT traversal resource to a destination P2P node. A middle P2P node and the destination P2P node receiving the message carrying the request for collecting the NAT traversal resource collect the NAT traversal resource. The middle P2P node and the destination P2P node send the collected NAT traversal resource to a first P2P node. A P2P node and a P2P system are also provided.

9 Claims, 1 Drawing Sheet

(56) References Cited

OTHER PUBLICATIONS

Ford et al., "Peer-to-Peer Communication Across Network Address Translators", 2005 USENIX Annual Technical Conference. XP-002408088.

Cooper et al. NAT Traversal for DSIP, P2PSIP Working Group. Feb. 25, 2007.

Wang et al., "Research on Symmetric NAT Traversal in P2P Applications", Department of Computer Science, East China Normal University, Shanghai, China. IEEE Computer Society 2006.

* cited by examiner

METHOD FOR ACQUIRING TRAVERSAL RESOURCE, PEER TO PEER NODE AND PEER TO PEER SYSTEM

CROSS-REFERENCE TO RELATED APPLICATIONS

This application is a continuation of International Application No. PCT/CN2008/071016, filed on May 20, 2008, which claims priority to Chinese Patent Application No. 200710122704.6, filed on Jun. 27, 2007, both of which are hereby incorporated by reference in their entireties.

FIELD OF THE DISCLOSURE

The present disclosure relates to the communication field, and more particularly to a method for acquiring a traversal resource, a peer to peer (P2P) node, and a P2P system.

BACKGROUND OF THE DISCLOSURE

Network address translation (NAT) has been widely applied in Internet. The NAT technology is used to isolate an internal network from an external network (usually referring to Internet), so as to provide security protection for the internal network and also solve the problem that the Internet Protocol version 4 (IPv4) has insufficient addresses. For the NAT, a host in an NAT internal network is called an internal host and a host in an NAT external network is called an external host.

A peer to peer (P2P) technology makes full use of a capability of each node in a network, so that the nodes provide services for each other. The NAT allows a packet sent by an external host that has communicated with an internal host to enter the internal network, but a packet sent by an external host that has not ever communicated with an internal host may be discarded. In the P2P, each P2P node (peer) may serve as a server, and the other peers initiate requests for collecting resources to an internal host acting as a peer. The NAT may discard information sent by peers of the external network. In order to solve the problem, in a P2P containing NAT, an internal host may have three types of addresses as follows. The first is host candidate address, which is an interface address of an internal host. The second is server reflexive candidate address, which is an address assigned to the internal host by the NAT. The third is relay candidate address, which is an address assigned, to the internal host by a traversal using relays around NAT (TURN) server. After acquiring the three types of addresses, the external host may communicate with the internal host through the P2P technology. The NAT traversal refers that the communication is established between an internal host and an external host of an NAT. The NAT traversal resource refers to an entity providing services associated with the NAT traversal. The P2P peer forwards messages according to a certain routing policy. A routing process refers that a message is routed and forwarded on an overlay network according to a key value. A peer that forwards the message is called a middle peer. A destination of the message is called a destination peer.

In a related art, an NAT traversal resource is acquired through a universal service discovery mechanism. The P2P utilizes a Hash algorithm to calculate a key value of an NAT traversal resource and stores a peer that can provide the NAT traversal resource under the key value. When a first peer needs to search for the NAT traversal resource, the first peer sends a message for searching for the NAT traversal resource to the P2P. Then, according to the key value of the NAT traversal resource, the peer in charge of the key value is obtained. Then, the peer in charge of the key value sends the NAT service resource under the key value to the first peer, so that the first peer acquires the NAT traversal resource.

In the process of researching and implementing the related art, the inventor finds out the following problems in the related art. The number of peers in the P2P is rather large. Most of the peers are internal hosts of the NAT. In order to realize the P2P communication with other peers, the internal hosts send messages for searching for NAT traversal resources. As all these messages are sent to the peer in charge of the key values of the NAT traversal resources, the peer carries an excessively large work load, which may cause a searching failure.

SUMMARY OF THE DISCLOSURE

Various embodiments of the present disclosure provide a method for acquiring a traversal resource, a peer to peer (P2P) node, and a P2P system, so as to acquire a network address translation (NAT) traversal resource in a' routing process.

In order to solve the technical problems, the embodiments of the present disclosure are implemented through the following technical solutions.

A method for acquiring an NAT traversal resource includes: generating, by a P2P entity generates a message carrying a request for collecting the NAT traversal resource and sending the message carrying the request for collecting the NAT traversal resource to a destination P2P node; collecting, by a middle P2P node and the destination P2P node receiving the message carrying the request for collecting the NAT traversal resource, the NAT traversal resource; and sending, by the middle P2P node and the destination P2P node, the collected NAT traversal resource to a first P2P node.

A method for acquiring an NAT traversal resource includes: receiving, by a middle P2P node NAT traversal service capability information published by other P2P nodes through a routing table and/or a neighbor table; and acquiring, by the middle P2P node, the NAT traversal resource according to the NAT traversal service capability information.

A P2P node includes a message receiving unit, a traversal resource collecting unit, and a traversal resource sending unit. The message receiving unit is configured to receive a message carrying a request for collecting an NAT traversal resource. The traversal resource collecting unit is configured to collect the NAT traversal resource when the message receiving unit receives the message carrying the request for collecting the NAT traversal resource. The traversal resource sending unit is configured to send the NAT traversal resource collected by the traversal resource collecting unit.

A P2P system includes a P2P entity, a middle P2P node, and a destination P2P node. The P2P entity is configured to generate and send a message carrying a request for collecting an NAT traversal resource. The middle P2P node is configured to receive the message carrying the request for collecting the NAT traversal resource sent by the P2P entity, collect the NAT traversal resource, and send the collected NAT traversal resource to a first P2P node, and is further configured to forward the received message carrying the request for collecting the NAT traversal resource when it is determined that a destination of the received message carrying the request for collecting the NAT traversal resource is not the middle P2P node. The destination P2P node is configured to receive the message carrying the request for collecting the NAT traversal resource sent by the first P2P node, collect the NAT traversal resource, and send the collected NAT traversal resource to the first P2P node.

As seen from the technical solutions, in the embodiments of the present disclosure, a P2P entity generates a message carrying a request for collecting an NAT traversal resource and sends the message carrying the request for collecting the NAT traversal resource to a destination P2P node. A middle P2P node receives the message carrying the request for collecting the NAT traversal resource, collects the NAT traversal resource, and sends the collected NAT traversal resource to a first P2P node. As the message carrying the request for collecting the NAT traversal resource is transmitted in the P2P network in a routing manner, the message may pass several middle P2P nodes before reaching a destination P2P node. In the technical solutions, the middle P2P node can collect the NAT traversal resource and send the NAT traversal resource to the first P2P node, so that the NAT traversal resource is acquired in the routing process, thereby decreasing the work load of the destination P2P node.

DETAILED DESCRIPTION OF THE EMBODIMENTS

Embodiment 1

Figure 1:
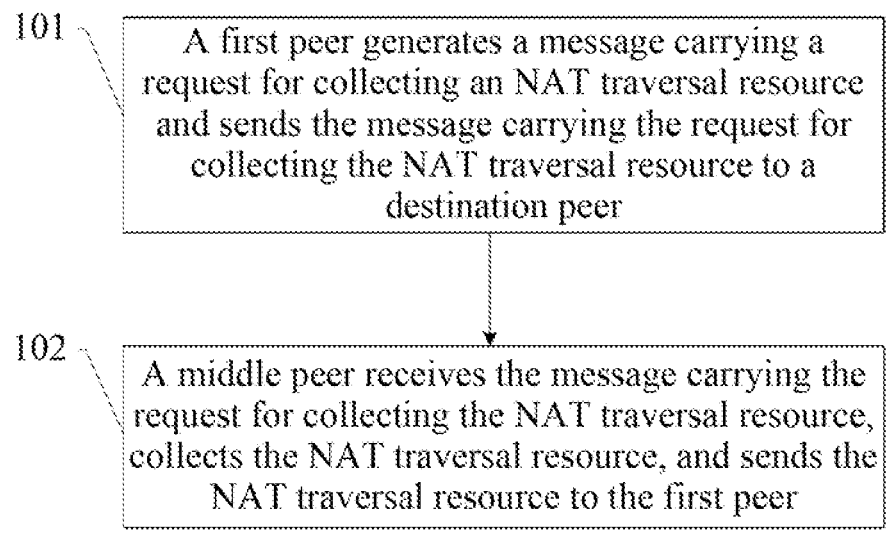
FIG. 1 is a flow chart of a method for acquiring an NAT traversal resource according to a first embodiment of the present disclosure.

FIG. 1 is a flow chart of a method for acquiring an NAT traversal resource according to a embodiment 1 of the present disclosure.

In Step 101, a first peer generates a message carrying a request for collecting an NAT traversal resource and sends the message carrying the request for collecting the NAT traversal resource to a destination peer.

The message is routed and forwarded on an overlay network according to a key value, which may be a resource storage message (Put message) or a resource searching message (Get message). In this embodiment, the message in the conventional art is extended, and the message carries the request for collecting the NAT traversal resource.

The NAT traversal resource includes a simple traversal of a user datagram protocol (UDP) through NATs (STUN) server and a traversal using relay NAT (TURN) server. Many peers can provide functions of the STUN server/TURN server, and these peers may serve as NAT traversal resources.

In Step 102, a middle peer receives the message carrying the request for collecting the NAT traversal resource, collects the NAT traversal resource when the middle peer discovers that the message carries the request for collecting the NAT traversal resource, and sends the NAT traversal resource to the first peer.

In this embodiment, the middle peer and the destination peer are named with respect to the message carrying the request for collecting the NAT traversal resource. A peer that forwards the message is referred to as a middle peer. A destination of the message is referred to as a destination peer. The first peer and the destination peer refer to a specific peer. The message may pass several middle peers before reaching the destination peer. The middle peer refers to a type of peers that forward the message.

In this embodiment, a peer with an NAT traversal service capability may inform other peers about the NAT traversal service capability provided by the peer through a routing table and/or a neighbor table. In such a manner, the middle peer may collect the NAT traversal resource through the routing table and/or the neighbor table. It should be understood that, the middle peer itself may become the NAT traversal resource.

The middle peer may return the collected NAT traversal resource to the first peer in a form of making a response, or may also send the collected NAT traversal resource to the first peer through the destination peer.

Embodiment 2

This embodiment is based on embodiment 1. In this embodiment, the message carrying the request for collecting the NAT traversal resource is forwarded in an iterative routing manner.

The message carrying the request for collecting the NAT traversal resource may pass several middle peers. When a middle peer receives the message carrying the request for collecting the NAT traversal resource, due to the iterative routing manner, the middle peer acquires next-hop peer information of the message, collects the NAT traversal resource, and returns the collected NAT traversal resource and the next-hop peer information to the first peer in a form of making a response.

The destination peer receives the message carrying the request for collecting the NAT traversal resource, processes tasks of the message itself, further collects the NAT traversal resource, and returns the collected NAT traversal resource and a processing result of the message to the first peer in a form of making a response.

Embodiment 3

This embodiment is based on embodiment 1. In this embodiment, the message carrying the request for collecting the NAT traversal resource is forwarded in a recursive routing manner in the routing process.

The message carrying the request for collecting the NAT traversal resource may pass a plurality of middle peers. When a middle peer receives the message carrying the request for collecting the NAT traversal resource, due to the recursive routing manner, the middle peer collects the NAT traversal resource, adds the collected NAT traversal resource in the message, sends the message carrying the request for collecting the NAT traversal resource and the NAT traversal resource to the destination peer, and sends the collected NAT traversal resource to the first peer through the destination peer.

Before the message carrying the request for collecting the NAT traversal resource sent by the first peer to the destination peer reaches the destination peer, the message may pass several middle peers. The destination peer receives the message carrying the request for collecting the NAT traversal resource and the NAT traversal resource, processes tasks of the message itself, further collects the NAT traversal resource, and sends the collected NAT traversal resource together with the NAT traversal resource carried in the message to the first peer.

For the convenience of message transmission, a resource set of the NAT traversal resource may be established in the message carrying the request for collecting the NAT traversal resource. When the middle peer adds the collected NAT traversal resource in the message, the collected NAT traversal resource is first compared with the resource set in the message. If the collected NAT traversal resource does not exist in the resource set, the collected NAT traversal resource is added in the resource set. If the collected NAT traversal resource has already existed in the resource set, the NAT traversal resource is not added. When the destination peer receives the message carrying the resource set, the collected NAT traversal resource is first compared with the resource set in the message. If the collected NAT traversal resource does not exist in the resource set, the collected NAT traversal resource is added in the resource set. If the collected NAT traversal resource has already existed in the resource set, the NAT traversal resource is not added. The destination peer sends the resource set to the first peer.

Embodiment 4

This embodiment is based on embodiment 2 or embodiment 3. In this embodiment, a P2P application using a session initiation protocol (SIP) is described. In the SIP-based P2P, two types of network entities, that is, peers and P2P clients, are defined. The peers form an overlay network and provide routing and storage services. The client searches for resources in the overlay network and stores resources to the overlay network through peers associated with the client.

A P2P client sends a message carrying a request for acquiring an NAT traversal resource to a first peer associated with the P2P client. When receiving the message, the first peer collects the NAT traversal resource, adds the collected NAT traversal resource in a temporary resource table, generates a message carrying a request for collecting the NAT traversal resource according to the message carrying the request for acquiring the NAT traversal resource sent by the P2P client, and sends the message carrying the request for collecting the NAT traversal resource to a destination peer. According to the method in embodiment 2 or embodiment 3, the middle peer and the destination peer send the NAT traversal resource to the first peer. The first peer adds the received NAT traversal resource in the temporary resource table and sends the temporary resource table to the P2P client.

In this embodiment, a peer may interact with a client associated with the peer and figure out whether the client has an NAT traversal capability or not. The client with an NAT traversal capability is considered as an NAT traversal resource.

If the peer itself acquires the NAT traversal resource, a Join message for joining in the overlay network may be adopted to carry the request for collecting the NAT traversal resource. Alternatively, a Get message or a Put message may also be adopted to carry the request for collecting the NAT traversal resource. In contrast, the client does not need to join in the overlay network, so that the Join message cannot be adopted to carry the request for collecting the NAT traversal resource. The Get message or the Put message may be adopted to carry the request for collecting the NAT traversal resource.

Embodiment 5

In this embodiment, a P2P network includes a first P2P node, a middle P2P node, and a destination P2P node.

The first P2P node is configured to generate a message carrying a request for collecting an NAT traversal resource and send the message carrying the request for collecting the NAT traversal resource. The middle P2P node is configured to receive the message carrying the request for collecting the NAT traversal resource sent by the first P2P node, collect the NAT traversal resource, and send the collected NAT traversal resource to the first P2P node. When it is determined that a destination of the received message carrying the request for collecting the NAT traversal resource is not the middle P2P node, the middle P2P node forwards the received message carrying the request for collecting the NAT traversal resource. The destination P2P node is configured to receive the message carrying the request for collecting the NAT traversal resource sent by the first P2P node, collect the NAT traversal resource, and send the collected NAT traversal resource to the first P2P node.

When the first P2P node sends the message carrying the request for collecting the NAT traversal resource, the first P2P node specifically sends the message carrying the request for collecting the NAT traversal resource to the destination P2P node.

The middle P2P node may further include a message receiving unit, a traversal resource collecting unit, a traversal resource sending unit, and a message forwarding unit.

The message receiving unit is configured to receive the message carrying the request for collecting the NAT traversal resource.

The traversal resource collecting unit is configured to collect the NAT traversal resource when the message receiving unit receives the message carrying the request for collecting the NAT traversal resource.

The traversal resource sending unit is configured to send the NAT traversal resource collected by the traversal resource collecting unit.

The message forwarding unit is configured to forward the message carrying the request for collecting the NAT traversal resource received by the message receiving unit, when it is determined that a destination of the message carrying the request for collecting the NAT traversal resource received by the message receiving unit is not the middle P2P node.

The NAT traversal resource may be collected through a routing table and/or a neighbor table. Accordingly, the traversal resource collecting unit may include a module for collecting the NAT traversal resource through a routing table, and/or a module for collecting the NAT traversal resource through a neighbor table. The message may be a message for being routed and forwarded on an overlay network according to a key value.

Furthermore, the middle P2P node may send the collected NAT traversal resource to the first P2P node in two manners as follows.

If the message carrying the request for collecting the NAT traversal resource is forwarded in an iterative routing manner in a routing process, the middle P2P node returns the collected NAT traversal resource to the first P2P node in a form of making a response.

If the message carrying the request for collecting the NAT traversal resource is forwarded in a recursive routing manner in the routing process, the middle P2P node adds the collected NAT traversal resource in the message, sends the message carrying the request for collecting the NAT traversal resource and the NAT traversal resource to the destination P2P node, and sends the collected NAT traversal resource to the first P2P node through the destination P2P node. When the message carrying the request for collecting the NAT traversal resource is forwarded in the recursive routing manner, the middle P2P node may also return the collected NAT traversal resource to the first P2P node in a form of making a response.

For the recursive routing manner, the destination P2P node receives the message carrying the request for collecting the NAT traversal resource and the NAT traversal resource, collects the NAT traversal resource, and sends the collected NAT traversal resource together with the NAT traversal resource carried in the message to the first P2P node.

Embodiment 6

Figure 2:
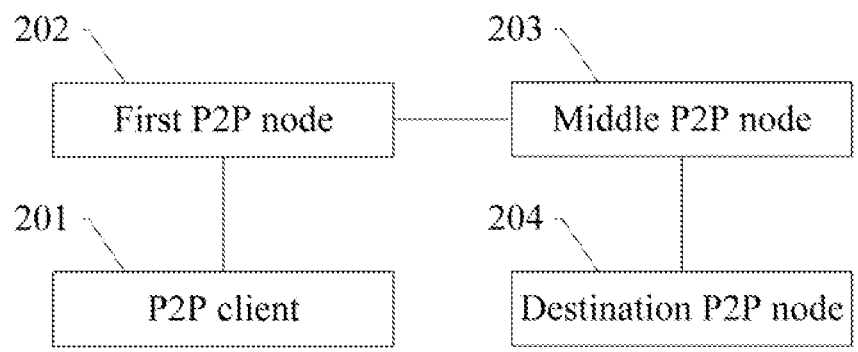
FIG. 2 is a schematic view of a P2P system according to a sixth embodiment of the present disclosure.

FIG. 2 is a schematic view of a P2P network system according to embodiment 6 of the present disclosure.

In this embodiment, a SIP-based P2P application is described. In the SIP-based P2P, two types of network entities, that is, P2P nodes and P2P clients are defined. In this embodiment, a P2P network includes a P2P client 201, a first P2P node 202, a middle P2P node 203, and a destination P2P node 204. The P2P client 201 is configured to send a message carrying a request for acquiring an NAT traversal resource. The first P2P node 202 is configured to receive the message carrying the request for acquiring the NAT traversal resource sent by the P2P client 201, collect the NAT traversal resource, add the collected NAT traversal resource in a temporary resource table, generate a message carrying a request for collecting the NAT traversal resource according to the message carrying the request for acquiring the NAT traversal resource, and send the message carrying the request for collecting the NAT traversal resource. The middle P2P node 203 is configured to receive the message carrying the request for collecting the NAT traversal resource sent by the first P2P node 202, collect the NAT traversal resource, and send the collected NAT traversal resource to the first P2P node 202. The middle P2P node 203 is further configured to forward the received message carrying the request for collecting the NAT traversal resource when it is determined that a destination of the received message carrying the request for collecting the NAT traversal resource is not the middle P2P node 203. The destination P2P node 204 is configured to receive the message carrying the request for collecting the NAT traversal resource sent by the first P2P node 202, collect the NAT traversal resource, and send the collected NAT traversal resource to the first P2P node 202.

When the first P2P node 202 sends the message carrying the request for collecting the NAT traversal resource, the first P2P node 202 specifically sends the message carrying the request for collecting the NAT traversal resource to the destination P2P node 204.

When receiving the NAT traversal resource sent by the middle P2P node 203 and the destination P2P node 204, the first P2P node 202 adds the received NAT traversal resource in the temporary resource table and sends the temporary resource table to the P2P client 201.

The NAT traversal resource may be collected through a routing table and/or a neighbor table. The message may be a message for being routed and forwarded on an overlay network according to a key value.

Furthermore, the middle P2P node 203 may send the collected NAT traversal resource to the first P2P node 202 in two manners as follows.

If the message carrying the request for collecting the NAT traversal resource is forwarded in an iterative routing manner in a routing process, the middle P2P node 203 may return the collected NAT traversal resource to the first P2P node 202 in a form of making a response.

If the message carrying the request for collecting the NAT traversal resource is forwarded in a recursive routing manner in the routing process, the middle P2P node 203 adds the collected NAT traversal resource in the message, sends the message carrying the request for collecting the NAT traversal resource and the NAT traversal resource to the destination P2P node 204, and sends the collected NAT traversal resource to the first P2P node 202 through the destination P2P node 204.

For the recursive routing manner, the destination P2P node 204 receives the message carrying the request for collecting the NAT traversal resource and the NAT traversal resource, collects the NAT traversal resource, and sends the collected NAT traversal resource together with the NAT traversal resource carried in the message to the first P2P node 202.

As seen from the above technical solutions, in the embodiments of the present disclosure, a first P2P node 202 generates a message carrying a request for collecting an NAT traversal resource, and sends the message carrying the request for collecting the NAT traversal resource to a destination P2P node 204. A middle P2P node 203 receives the message carrying the request for collecting the NAT traversal resource, collects the NAT traversal resource, and sends the collected NAT traversal resource to the first P2P node 202. As the message carrying the request for collecting the NAT traversal resource is transmitted in the P2P network in a routing manner, the message may pass several middle P2P nodes 203 before reaching the destination P2P node 204. In the technical solutions, the NAT traversal resource may be acquired through the middle P2P nodes 203, so that the NAT traversal resource is acquired in the routing process, thereby the work load of the destination P2P node is reduced.

As seen from the above technical solutions, in the embodiments of the present disclosure, it is not required to construct a message exclusively configured to send a request for collecting an NAT traversal resource. Instead, a message for being routed and forwarded on an existing overlay network according to a key value is extended. Specifically, the request for collecting the NAT traversal resource is "additionally" carried in such a message. As a lot of messages are routed and forwarded on the overlay network according to key values, a certain message may be selected for being extended according to the practical environment, so as to the flexibility for implementing the solution is increased.

As seen from the above technical solutions, in the embodiments of the present disclosure, when a P2P node receives a message carrying a request for collecting an NAT traversal resource, the NAT traversal resource is collected through a routing table and/or a neighbor table, rather than through a key value. The dispersible feature is achieved when the NAT traversal resource is collected through the routing table and/or the neighbor table, so that the efficiency of acquiring the traversal resource is increased.

The method for acquiring a traversal resource, the P2P node, and the P2P system provided in the embodiment of the present disclosure are illustrated in detail. Persons of ordinary skill in the art can make variations and modifications to the embodiment of the present disclosure in terms of the specific implementations and application scopes according to the ideas of the present disclosure. Therefore, the specification shall not be construed as a limit to the present disclosure.

What is claimed is:

1. A method for acquiring a network address translation (NAT) traversal resource, comprising:
    generating, by a peer to peer (P2P) entity, a message carrying a request for collecting an NAT traversal resource, and sending the message carrying the request for collecting the NAT traversal resource to a destination P2P node;
    collecting, by a middle P2P node and the destination P2P node receiving the message carrying the request for collecting the NAT traversal resource, the NAT traversal resource; and
    sending, by the middle P2P node and the destination P2P node, the collected NAT traversal resource to a first P2P node
    wherein the sending, by the middle P2P node and the destination P2P node, the collected NAT traversal resource to the first P2P node further comprises:
    adding, by the middle P2P node, the collected NAT traversal resource in the message carrying the request for collecting the NAT traversal resource, and sending the message to the destination P2P node; and
    receiving, by the destination P2P node, the message carrying the request for collecting the NAT traversal resource and the NAT traversal resource, collecting the NAT traversal resource, and sending the NAT traversal resource collected by the destination P2P node and the NAT traversal resource carried in the message to the first P2P node.

2. The method according to claim 1, wherein the P2P entity is the first P2P node.

3. The method according to claim 1, wherein the P2P entity is a P2P client, and the method further comprises:
   receiving, by the first P2P node, a message carrying a request for acquiring an NAT traversal resource sent by the P2P client, collecting the NAT traversal resource, and adding the collected NAT traversal resource in a temporary resource table; and
   generating, by the first P2P node, the message carrying the request for collecting the NAT traversal resource according to the message carrying the request for acquiring the NAT traversal resource sent by the P2P client.

4. The method according to claim 3, further comprising:
   receiving, by the first P2P node, the NAT traversal resource collected by the middle P2P node and the destination P2P node, adding the received NAT traversal resource in the temporary resource table, and sending the temporary resource table to the P2P client.

5. The method according to claim 1, wherein the collecting the NAT traversal resource further comprises collecting the NAT traversal resource through a routing table and/or a neighbor table.

6. The method according to claim 1, wherein the message carrying the request for collecting the NAT traversal resource is a message for being routed and forwarded on an overlay network according to a key value.

7. A peer to peer (P2P) system, comprising:
   a P2P entity, configured to generate and send a message carrying a request for collecting a network address translation (NAT) traversal resource;
   a middle P2P node, configured to receive the message carrying the request for collecting the NAT traversal resource sent by the P2P entity, collect the NAT traversal resource, send the collected NAT traversal resource to a first P2P node, and forward the received message carrying the request for collecting the NAT traversal resource when it is determined that a destination of the received message carrying the request for collecting the NAT traversal resource is not the middle P2P node; and
   a destination P2P node, configured to receive the message carrying the request for collecting the NAT traversal resource sent by the first P2P node, collect the NAT traversal resource, and send the collected NAT traversal resource to the first P2P node, wherein the middle P2P node is further configured to add the collected NAT traversal resource in the forwarded message carrying the request for collecting the NAT traversal resource; and the destination P2P node is further configured to send the NAT traversal resource in the message carrying the request for collecting the NAT traversal resource forwarded by the middle P2P node to the first P2P node.

8. The P2P system according to claim 7, wherein the P2P entity is the first P2P node.

9. The P2P system according to claim 7, wherein the P2P entity is a P2P client;
   the P2P client is configured to send a message carrying a request for acquiring an NAT traversal resource; and
   the first P2P node is further configured to receive the message carrying the request for acquiring the NAT traversal resource sent by the P2P client, collect the NAT traversal resource, and add the collected NAT traversal resource in a temporary resource table, and is further configured to receive the NAT traversal resource collected by the middle P2P node and the destination P2P node, add the received NAT traversal resource in the temporary resource table, and send the temporary resource table to the P2P client.

* * * * *